L. SCHRÖDER & A. MÜLLER.
ALTERNATING CURRENT PLANT COMBINED WITH STORAGE BATTERY.
APPLICATION FILED OCT. 7, 1904.
987,495.
Patented Mar. 21, 1911.
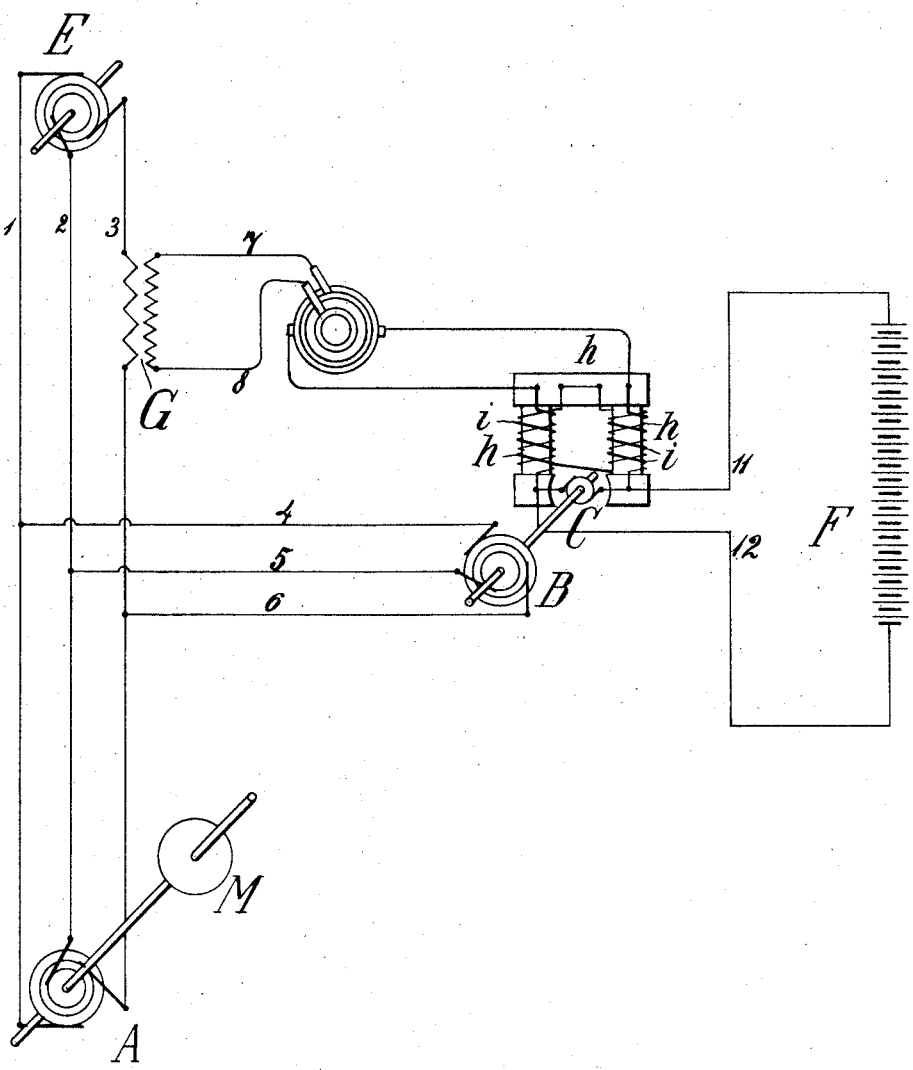
WITNESSES:
N. M. Avery
J. P. Davis
INVENTORS
Ludwig Schröder
Adolph Müller
BY
Munn & Co
ATTORNEYS

UNITED STATES PATENT OFFICE.

LUDWIG SCHRÖDER AND ADOLPH MÜLLER, OF BERLIN, GERMANY.

ALTERNATING-CURRENT PLANT COMBINED WITH STORAGE BATTERY.

987,495. Specification of Letters Patent. Patented Mar. 21, 1911.

Application filed October 7, 1904. Serial No. 227,527.

*To all whom it may concern:*

Be it known that we, LUDWIG SCHRÖDER and ADOLPH MÜLLER, subjects of the German Emperor, and residents of Berlin, Germany, have invented Improvements in Alternating-Current Plants Combined with Storage Batteries.

Our invention relates to alternating current plants combined with storage batteries and has the purpose to regulate the charging and discharging of the storage battery in such a manner that if the current used in the plant varies the main motor actuating the main generator is working with constant load.

As is well known, electric plants, the currents of which are subjected to great fluctuations, are combined with a storage battery being charged by the excess of current not used in the plant and discharging current into the plant if there is more current wanted than generated by the main generator. In alternating current plants a rotary converter is to be used, as the storage battery can only be charged by a direct or continuous current, the alternating current portion of this converter being connected with the wires of the plant and the direct current portion being connected with the storage battery. If a small current is used in the plant the excess of current produced by the main generator will drive the rotary converter and the current produced by the direct current portion will charge the battery. If on the contrary the plant use more current than the main generator can produce then the alternating portion of the rotary converter will be driven by the direct current portion the battery discharging current into this portion and producing alternating current assisting the current produced by the main generator. In this known system no special means were provided to regulate the charging and discharging current automatically, this regulating being done by hand by regulating the shunt of the direct current portion of the transformer. The regulating of the charging and discharging current was automatical only in the case, when by a strong declivity of the characteristics of the main generator the fluctuations of intensity cause the tension of the alternating current to rise or to fall considerably.

Now our invention consists in regulating automatically the charging and discharging current of the battery, even if there are no variations in the tension of the alternating current plant in such a manner that the main motor actuating the main generator is working always with constant load.

We do not limit ourselves to the use of any particular kind of alternating current apparatus, but preferably employ the so-called "polyphase" system and arrange the wiring as shown in the accompanying drawing, in which the figure is diagrammatic and illustrates the relative arrangement of the various electric elements.

The main alternating current generator is shown at A and is driven by a steam engine, turbine, or analogous prime mover M, the main motor at E being an alternating current motor, a motor generator consisting of the alternating current portion B and the direct current portion C coupled together, a storage battery at F, connected with the brushes of the direct current portion by the wires 7 and 8. A transformer G is connected by the wires 7, 8 with the alternating portion of a rotary converter D, the direct current portion of the latter being connected by wires 9 and 10 with a winding $i$ upon the field of the direct current portion C of the motor generator B, C. Another winding $h$ upon the field of the direct current portion C of this motor generator opposes the winding $i$. The leads 1, 2 and 3 connect the main generator A with the main motor E. The alternating current portion of the motor generator B, C, is connected by wires 4, 5 and 6 with the leads 1, 2 and 3.

The action of the system is as follows: If the current used in the alternating current motor E is very small the current flowing through the secondary winding of the transformer G, being also small, will be converted by the rotary converter D into a small direct current flowing through the winding $i$. At the same time the motor generator B, C, is driven by the excess current generated by A and not used by E, the direct current generated by the portion C flows into the battery F, the high electro-motive force of this current, necessary for charging the battery, is produced by the field highly excited by the winding $h$ proportional to the electro-motive force of the battery, and weakened only in a small degree by the small current flowing through the opposite winding $i$. Therefore the battery F is charged with a large current and a high electro-motive force, if the amount of current used in E is small. If an excess of current is wanted in the motor E, the direct current in the winding $i$ is large, thereby greatly weakening the magnetic field and the electro-motive force of the portion C of the motor generator to such a degree that the electro-motive force of the battery F is greater than that of the direct current portion C of the motor generator B, C. Therefore the battery is discharged into the portion C which acts as a motor and drives the portion B which now generates alternating currents feeding the plant E together with the main generator A. In this manner the main generator constantly furnishes nearly the same intensity of current with the same tension or with small fluctuations of tension independent of the amount of current used in the plant at different times, the charging and discharging of the battery being regulated automatically, and the prime mover M actuating the main generator A, being worked constantly at the same load.

We find in general that arrangement is better adapted for branches from the main line than for trunk lines though either of the systems above described may be used upon such trunk lines.

Having thus described our invention we claim as new and desire to secure by Letters Patent:

The combination of a main alternating current generator, alternating current mains fed thereby, a motor generator, both sides of which can act as motor as well as generator, and the direct current side of which is provided with an armature and two field windings opposing each other, conductors from the alternating current side of said motor generator to said alternating current mains, a storage battery, connections between the armature of the direct current side of said motor generator and said storage battery, connections between one of the field windings of the direct current side of said motor generator and said storage battery, a series transformer the primary coil of which is inserted in one of said alternating current mains, a rotary converter, connections between the alternating current side of said rotary converter and the secondary coil of said series transformer, and connections between the direct current side of said rotary converter and the second field winding on the direct current side of the said motor generator.

In testimony whereof we have signed our names to the specification, in the presence of two subscribing witnesses.

LUDWIG SCHRÖDER.
ADOLPH MÜLLER.

Witnesses:
HENRY HASPER,
WOLDEMAR HAUPT.

---

Copies of this patent may be obtained for five cents each, by addressing the "Commissioner of Patents, Washington, D. C."